United States Patent [19]

Thomason

[11] 4,403,312

[45] Sep. 6, 1983

[54] THREE-DIMENSIONAL SEISMIC DATA GATHERING METHOD

[75] Inventor: Herman B. Thomason, Plano, Tex.

[73] Assignee: Mobil Oil Corporation, New York, N.Y.

[21] Appl. No.: 221,600

[22] Filed: Dec. 30, 1980

[51] Int. Cl.³ ........................... G01V 1/04; G01V 1/20
[52] U.S. Cl. .......................................... 367/56; 367/40
[58] Field of Search ....................... 181/108, 111, 112; 367/50, 56, 63, 60, 59

[56] References Cited

U.S. PATENT DOCUMENTS

| | | | |
|---|---|---|---|
| 3,240,286 | 3/1966 | Musgrave | 367/63 |
| 3,381,266 | 4/1968 | Harris | 367/50 |
| 3,529,282 | 9/1970 | Brown et al. | 367/61 |
| 3,597,727 | 8/1971 | Judson et al. | 367/50 |
| 3,753,222 | 8/1973 | Trostle | 367/56 |
| 3,838,390 | 9/1974 | Michon | 367/59 X |
| 3,867,713 | 2/1975 | Tegland et al. | 367/56 |
| 4,170,002 | 10/1979 | Strange | 367/23 |
| 4,189,704 | 2/1980 | Martin et al. | 367/60 |

OTHER PUBLICATIONS

Geophysics, vol. 29, No. 2, Apr. 1964, pp. 221–222, Broding et al., "Study of Three-Dimensional Seismic Detection System".

Primary Examiner—Maynard R. Wilbur
Assistant Examiner—K. R. Kaiser
Attorney, Agent, or Firm—Alexander J. McKillop; James F. Powers, Jr.; George W. Hager, Jr.

[57] ABSTRACT

An improved method for three-dimensional seismic exploration of the subterranean structure of the earth is disclosed wherein arrays of sources of acoustic energy and of detectors of reflected energy are used. The configurations of both arrays are conjointly experimented with to improve the signal-to-noise ratio of the resultant data; the signals output by the detectors are summed, and are correlated with those output with respect to all acoustic energy emitted within a given array of sources.

10 Claims, 7 Drawing Figures

BLOCK PARAMETERS
- 192 RECORDING STATION — 192 ARRAYS OF 18 GEOPHONES
- 185 SOURCE POINTS — 185 ARRAYS OF 64 SOURCE LOCATIONS

TRACE SPACING = 100 FEET
X SOURCE POINT INTERVAL = 141 FEET
— SOURCE POINT INTERVAL = 100 FEET
MAXIMUM SOURCE / RECEIVER DISTANCE = 6788 FEET
SUBSURFACE SAMPLE AREA = 50 FEET

THREE-DIMENSIONAL SEISMIC DATA GATHERING METHOD

FIELD OF THE INVENTION

This invention relates to the field of seismic exploration for oil, gas and other minerals. More particularly, this invention relates to an improved method for providing a three-dimensional representation of the subterranean structure of the earth.

BACKGROUND OF THE INVENTION

It has been for many years common practice in the art of geophysical exploration for oil, gas and other minerals to perform seismic exploration of the earth's subterranean structure. From knowledge of the shapes of various layers of differing types of rocks in the earth's crust, experienced geophysicists can deduce the possible presence of various valuable minerals such as oil and gas. Seismic techniques generally involve the generation of a source of acoustic energy such as a blast of dynamite, the dropping of a heavy weight on the earth's surface or imparting of a mechanical vibration to the earth, the so-called "Vibroseis" technique. The Vibroseis technique has grown increasingly popular in recent years with the increasing cost of drilling for dynamite blasting to generate acoustic noise and the present invention primarily relates to this method of generating acoustic energy, although it is not so limited.

However generated, the acoustic energy travels downwardly through the earth and is reflected at the interfaces between differing layers of rock and returns upwardly to the earth's surface. The return of the waves of acoustic energy is detected by one or more geophones placed on the earth's surface. The time taken for the wave to travel downwardly, be reflected, and return upwardly, is measured and the time is proportional to the depth of the interface from which the wave was reflected between successive layers of rock beneath the earth's surface. Additional time measurements are then made with the source of acoustic energy and the detector spaced a distance from the first; comparison of the times taken by the first and second waves yields an indication of the change in the depth of the interface between the rock layers as the source and detectors move from one location to the next. If the outputs of the detectors are properly processed and are graphed in accordance with the relative positions of source and detector, a representation of a cross-section of the earth results, on which the interfaces between rock layers appear as deflections on the individual output lies, or "traces".

A great deal of prior art has been concerned with the problem of eliminating noise from the electrical records output by the geophones. One of the most common techniques is to provide a plurality of measurements of the time taken for acoustic waves to travel downwardly from a plurality of sources of acoustic energy located at differing locations, reflect from substantially the same point on the interface between rock layers, and reflect upwardly to a like plurality of geophones. Since in general the angle of incidence of the acoustic wave on the interface and its angle of reflection are equal, if the spacings of the geophones and of the sources are kept centered about a point on the earth's surface, it may be assumed that the reflections are from substantially the same point on the interface. If the resultant traces are then correlated, that is, if an event common to each of the records of the plurality of geophone outputs are aligned, thus correcting for the longer travel distance of a wave from an acoustic energy source located a longer distance from the point of reflection, and are then summed, the noise in the records, being random, will tend to cancel out, while the record of the reflection will be made stronger, thus increasing the signal-to-noise ratio of the record. This "common depth point" (CDP) technique is very widely used and is thoroughly described in the prior art. See, for example, U.S. Pat. No. 3,381,266 to Harris.

Most seismic exploration using the CDP technique has been done so as to provide a record indicative of a cross-section of the earth taken along a line of exploration. That is, the exploration has been generally linear. See U.S. Pat. No. 3,240,286 to Musgrave. However, it has been increasingly desirable to provide a more detailed picture of the sub-surface of the earth; hence three-dimensional techniques have more recently been developed. See for example, U.S. Pat. No. 3,867,713 to Tegland et al. In the Tegland et al technique, a plurality of arrays of detectors are disposed along lines forming an angle, preferably a 45° angle, to an overall line of exploration. To the extent that the lines of detectors broaden the line of exploration, this technique can yield a three-dimensional picture of the sub-surface data. However, the Tegland et al technique is limited in that it remains a linear technique, only broadening the line surveyed and hence frequently does not yield sufficiently detailed data to obtain a full picture of the sub-surface of the earth being surveyed. In addition to this deficiency of the Tegland et al patent, it will be appreciated by those skilled in the art that in general it is desirable to have as many records of reflections from a common depth point as possible so as to further increase the signal-to-noise ratio. The Tegland technique has only a limited number of records per common depth point surveyed. Other three-dimensional seismic data recordation schemes, such as in U.S. Pat. Nos. 3,529,282 to Brown et al and 3,597,727 to Judson et al suffer from the same deficiencies.

OBJECTS OF THE INVENTION

Accordingly, it is an object of the invention to provide an improved method for three-dimensional seismic exploration of subterranean structure.

A further object of the invention is to provide an improved method of seismic exploration wherein additional records are provided for each common depth point, whereby the signal-to-noise ratio of these records is improved.

Still a further object of the invention is to provide seismic records which can be used to provide a three-dimensional representation of the subterranean structure of the earth in which the signal-to-noise ratio is improved.

SUMMARY OF THE INVENTION

The above needs of the art and objects of the invention are satisfied by the present invention which comprises a method of exploration involving the simultaneous design of arrays of detectors and of plural sources of acoustic energy operated in phase with one another. Prior to the beginning of the exploration process, varying arrangements of plural geophones connected to a single recording instrument are operated so as to provide a single record of their summed outputs. Concurrently, experiments are also performed with an array of sources; the combination of the array of sources and of geophones which yields the lowest noise level is then used during the three-dimensional recording operations according to the invention. In a particularly preferred embodiment, the arrays of geophones are laid out around a closed loop enclosing the region of interest, and the arrays of sources move from point to point within the loop. This arrangement provides unprecedented flexibility to the system and allows the substantial improvement of the signal-to-noise ratio of the geophone records.

BRIEF DESCRIPTION OF THE DRAWINGS

The invention will be better understood if reference is made to the accompanying drawings, in which.

DESCRIPTION OF THE PREFERRED EMBODIMENT

Figure 1:
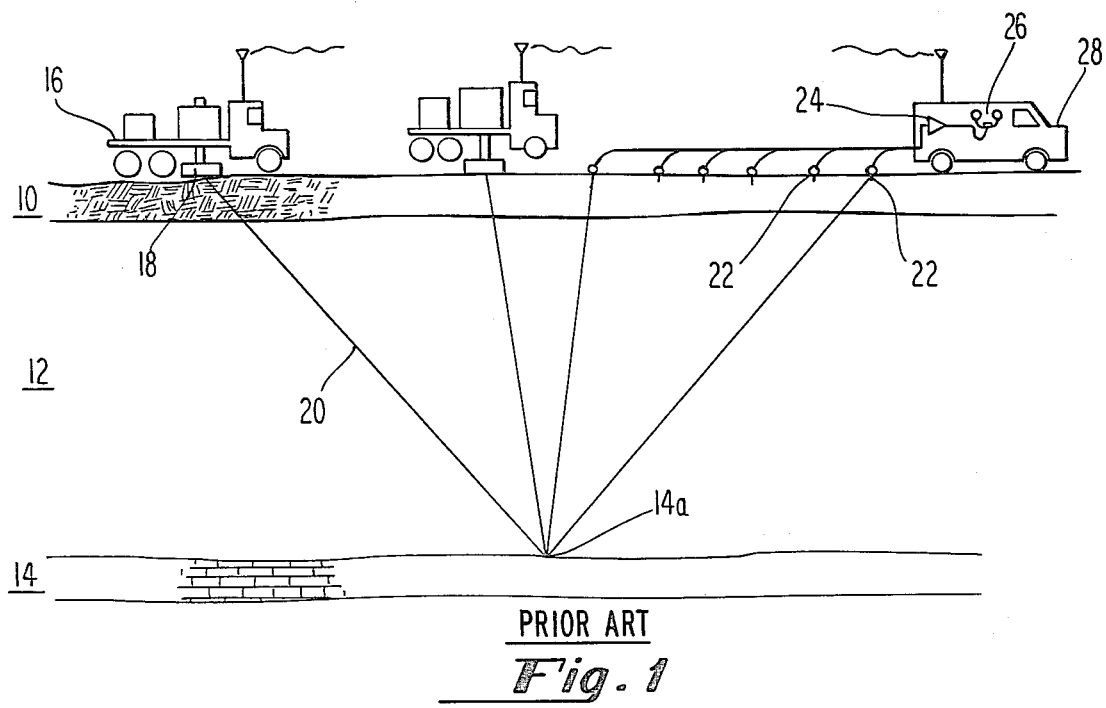
FIG. 1 represents a schematic side view of seismic exploration practices as in the prior art.

Referring now to FIG. 1 an overal view of a prior art seismic exploration operation is shown. The figure depicts a generally cross-sectional view of the earth which shows a surface layer 10, sub-surface layers 12 and a lower reflecting layer 14. A truck 16 fitted with a vibrating anvil 18 is the source of acoustic energy. The energy is transmitted along a line indicated generally at 20 downwardly into the earth, is reflected from layer 14 at a common depth point 14a, and passes back upwardly through the earth where it is detected by one or more of a plurality of geophones 22. The signal output by the geophone 22 is amplified by an amplifier 24 and recorded on a data recording unit 26, both of which may be carried in a second exploration truck 28. Radio equipment is provided as indicated schematically by antennas on the trucks 16 and 28 in order to enable recording of the actual time of transmission of the acoustic wave on the tape 26 and to allow communication of the operators.

As indicated in FIG. 1 a plurality of geophones 22 are simultaneously active. The outputs of these geophones, or traces, are individually recorded and later summed together with traces produced from reflection at a common depth point. Thus for example the truck 16 is shown in phantom at a second location transmitting acoustic energy downwardly to reflect from the same point 14a on the reflecting layer 14 as that produced at its earlier location. However, since the angles of incidence and of reflection of the acoustic waves are substantially equal, a different geophone picks up the reflection from this common depth point (CDP). Clearly, the truck 16 might also be positioned at other intervals between the two positions shown, and other geophones 22 would pick up the reflections from the common depth point 14a.

Figure 2:
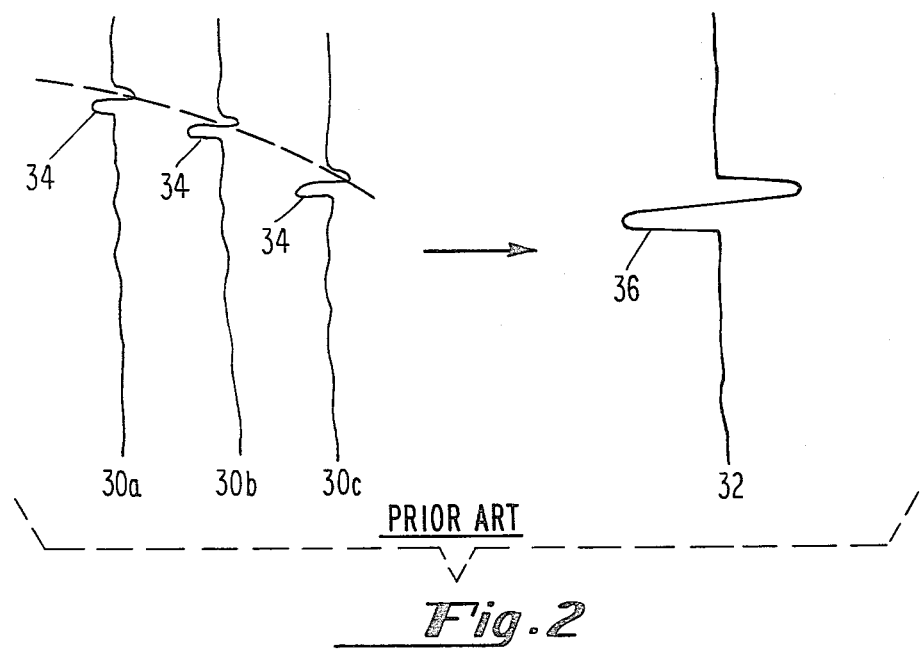
FIG. 2 shows how a plurality of individual geophone traces can be correlated and summed together to produce an overall record with an improved signal-to-noise ratio, also as in the prior art.

The summation of the individual traces from the common depth point 14a will now be described with respect to FIG. 2. The three traces, 30a, 30b, and 30c, on the left side of FIG. 2 may be taken to represent the outputs of individual ones of the geophones 22 with respect to a common depth point. That is, as the truck 16 is moved with respect to the geophones 22, records output by corresponding ones of the geophones 22 are recorded together according to well-known techniques, so that the records of the reflections from a common depth point are available together. As noted, the records 30a-c each exhibit a generally irregular shape indicating the presence of noise in the record, which is inevitable with any seismic data recording technique thus far made available, while each of the traces 30l-c also comprises a larger amplitude deflection 34, which represents the output of the geophone upon receipt of the reflected acoustic wave. As noted, the increased deflection portions 34 of the records 30a-c are not equidistant from the ends of the records. This is because the overall distance covered by the wave is a function of the horizontal distances of the source and of the geophones from that point directly above the common depth point 14a on the surface of the earth. Accordingly, the traces are correlated, that is, examined to determine common points on their shapes, as indicated by the dotted line in FIG. 2, either visually or by machine, are aligned, and are summed to yield the record 32 shown on the right of FIG. 2. Those skilled in the art will recognize that it is also possible to cross-correlate the individual geophone signals prior to summing those from a given array, possibly with use of a trace recording the input waveform. As noted, the amplitude of the increased amplitude deflection portion 36 of the wave 32 is much larger than those 34 of the individual traces 30a-c. Moreover, the random noise present in the traces 30a-c tends generally to cancel out, again increasing the signal to noise ratio of the resultant trace 32. A large number of the traces 32 are then generally printed out on the same visual record and the trends in the locations of the large amplitude deflections 36 are then deemed indicative of the subterranean structure.

Figure 3:
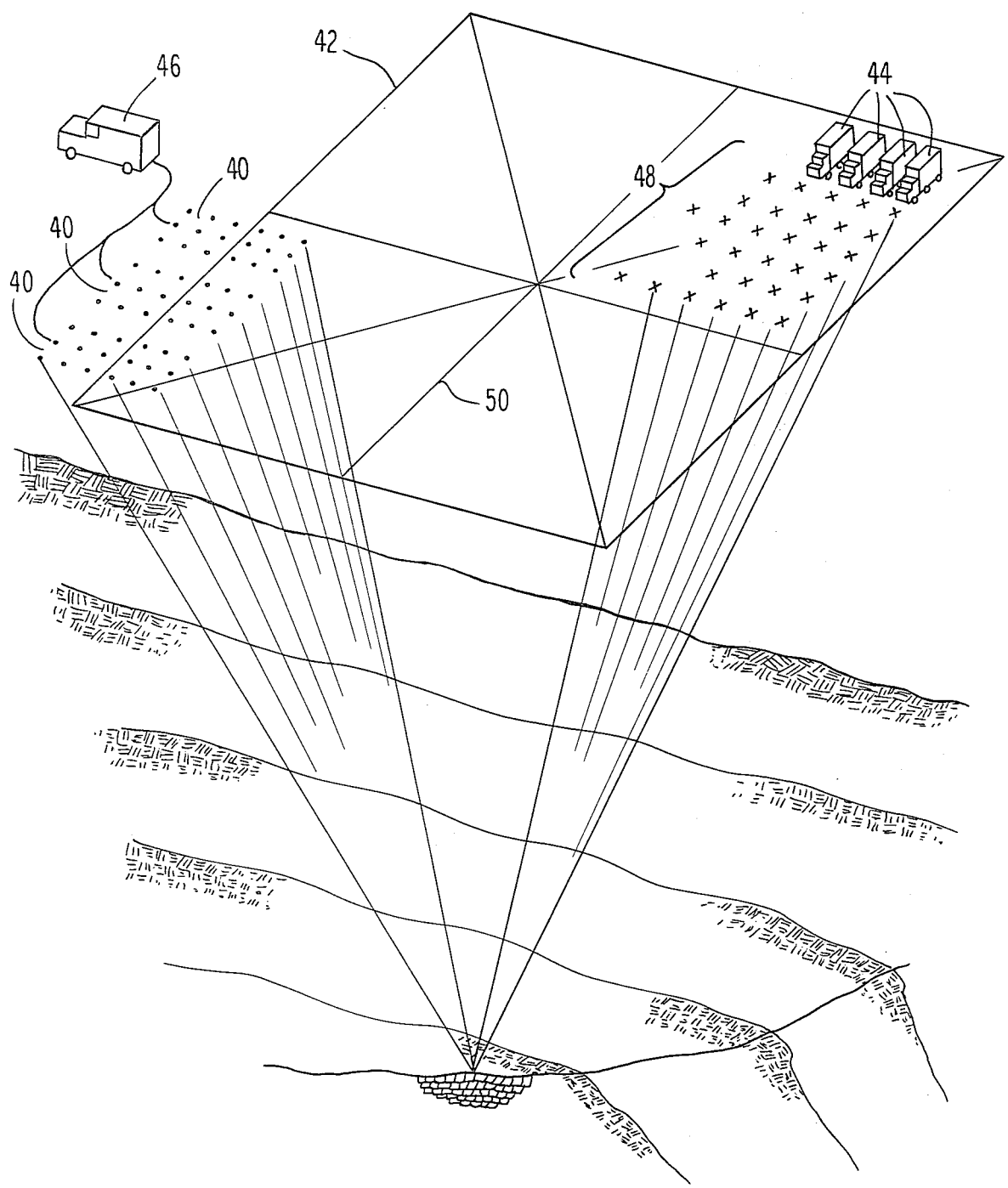
FIG. 3 represents an overall perspective view of the seismic exploration system according to the invention.

Reference will now be made to FIG. 3 for discussion of the overall system of seismic exploration according to the invention. FIG. 3 depicts an area of the surface of the earth which is disposed enerally above an area of subterranean region of the earth which is of interest and is to be explored. The basic mode of operation of the invention is to dispose a large number of geophones in a pattern on the surface of the earth determined generally in accordance with the structure of the area to be explored; such factors as difficulties with access to some portion of the area, such as inability to obtain the owner's permission, prior experimentation indicating difficult or complex structure, or the like may be relevant. In FIG. 3 a plurality of arrays of geophones indicated generally at 40 are disposed along a generally square perimeter 42 of the area of the earth's surface over the subterranean structure of interest. In a particularly successful test of this method of exploration, carried out in the Tip Top area of the Western Green River Basin in Wyoming, 192 arrays of geophones were laid out along the edges of three square blocks, each 4800 feet on each side. The spacing of the geophone arrays, therefore, was 100 feet. Each array consisted of 18 geophones connected together; the thus-summed signals were recorded on equipment carried in a recording truck 46. Their specific arrangement will be discussed in greater detail below. Generally, as indicated a 3×6 array of the 18 geophones was used such that its long dimension was perpendicular to the line delimiting the outside of the 4800 foot square block to be explored. After exploration of each block, the geophones were moved to the next. Concurrently with employment of the arrays 40 of pluralities of geophones are also employed an array 48 of sources of acoustic energy. For example, four trucks 44 similar to truck 16 of FIG. 1 were used in the Tip Top exploration. Each of the four trucks comprises means for imparting vibrational energy to the earth. Under the control of radio signals from the recording truck 46, each of the four trucks are operated simultaneously and in phase for a short period of time, typically 16 seconds, are then moved a short distance, operated again for a short period of time, and so on. In the Tip Top exploration, the four trucks each emitted energy at 16 points in an array; 185 array positions were thus "shot" in each block 42 outlined by the geophone arrays. The overall size of the arrays 48 and their spacing from one another was such that they physically overlapped; the individual trucks 44 are close enough together that the waves arrive at the geophones substantially simultaneously given the great distance through which the wave travels to be reflected from a subterranean layer and reflected back up to the geophones. In this way, a large quantity of energy from a large number of array locations all quite close together is made available, thus increasing the overall signal level so as to yield an improvement in signal-to-noise ratio. The use of the array 48 of trucks 44 all operating simultaneously allows further versatility in choice of the array configuration while tending to even out any locally generated noise thus further improving signal-to-noise ratio and allowing a relatively large area to be surveyed without continual movement of the geophones, which is a very time-consuming and arduous process. As noted, therefore, the plurality of sources of acoustic energy 44 are each used several times at a large number of array locations 48 which may be one of many along several lines of travel 50, which divide the overall square defined by the lines 42 along which the geophone arrays 40 are positioned into a large number of sub-blocks. In the Tip Top exploration, the points along the lines 50 at which the arrays of vibrating sources imparted acoustic energy to the earth were spaced at 100 foot intervals on the lines 50 perpendicular to the periphery of the square explored, and at 141 foot intervals along those at 45° angles; when these diagonals are projected on the periphery, equal spacing results. At each of the source points within the arrays 48, therefore, a large number of sources of acoustic energy 44 were caused to transmit waves downwardly into the earth to be reflected from an interface within the earth and to be detected by each of the geophone arrays 40. The vast quantity of data thus generated is of great value in producing an accurate physical pictorial representation of the subterranean surface of the earth. In particular, as noted above, the more records can be obtained from a single common depth point, the better the signal-to-noise ratio received and therefore the better the quality of the eventual pictorial representation available to the geophysicist in the search for valuable minerals.

Figure 4:
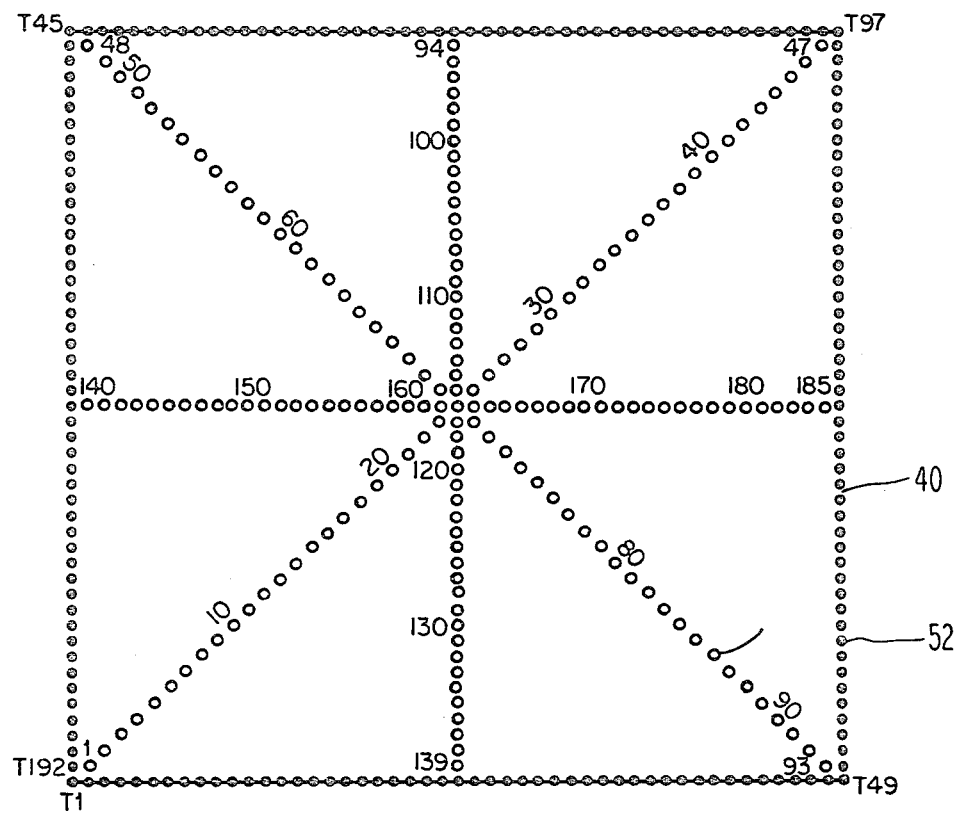
FIG. 4 shows the lay-out of an exploration block including arrays of sources of acoustic energy and of the geophones used to detect the reflected acoustic waves on the surface of the earth.
Figure 4A:
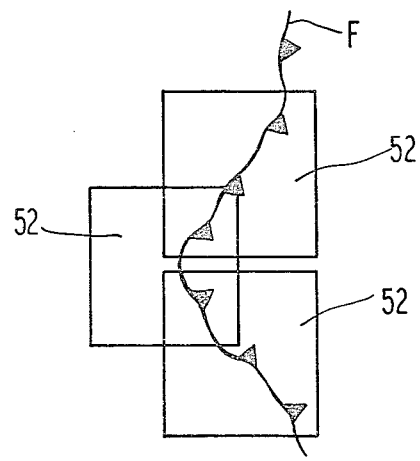
FIG. 4a shows overlapping blocks.

Reference will now be made to FIGS. 4a and 4 for a more detailed description of the precise arrangement of sources and detectors of acoustic energy used in the Tip Top exploration mentioned above. FIG. 4a shows the overall arrangement used, while FIG. 4 shows details. FIG. 4a shows the overlapping of three generally square regions of the earth 52 each of which is substantially identical and is as described in connection with FIG. 4. As noted in FIG. 4 each block 52 is outlined by a line of arrays of geophones 40. In the Tip Top exploration, each of the four sides of the 4800 foot square had 48 geophone arrays laid out on it disposed 100 feet apart. These were laid out by a crew, connected to a 192 trace recorder and were left undisturbed until all the shooting (i.e., the imparting of vibrational energy to the earth) had been completed for a given block. This shooting was done at each of the locations specified by the small circles within block 52 in FIG. 4. At each of these 185 source points, the four trucks each imparted energy to the ground at 16 places in accordance with an array defined more fully below in connection with FIG. 6. The resultant trace from each of the 192 arrays of geophones was recorded with respect to each of the 185 source points. The spacing of the arrays of source points along the lines of exploration parallel to one of the sides of the block 52 was 100 feet; along the diagonal lines, the spacing of the arrays was 141 feet, so that the net spacing along a line parallel to the side of the block was 100 feet in both cases. Accordingly, the maximum source to receiver distance was 6788 feet and a common depth point along any given interface beneath the block 52 was sampled every 50 feet. It will be appreciated by those skilled in the art that this scheme represents an enormous quantity of data and that this data can be combined according to methods known in the prior art to yield extremely detailed and complete information about the sub-surface structure. It will furthermore be appreciated by those skilled in the art that the use of the diagonal scheme of source locations permits the derivation of a complete three-dimensional picture of the subterranean surface of the earth and furthermore that the overlapping of the exploration blocks 52 as shown in FIG. 4a means that all areas within either the central portions of the squares or within those portions of the blocks which overlap are substantially covered by a high-degree multiple fold CDP technique, thus insuring that the area of interest is thoroughly explored. For example, in the Tip Top area, a fault is the geological feature of main interest. Accordingly, the locations of the various blocks 52 explored were chosen such that the fault lay continuously within the blocks. For example, in FIG. 4a if a fault F were to be explored, the blocks 52 might be laid out as indicated to insure that the fault was continuously covered and hence thoroughly explored by multi-fold CDP exploration methods.

Figure 5:
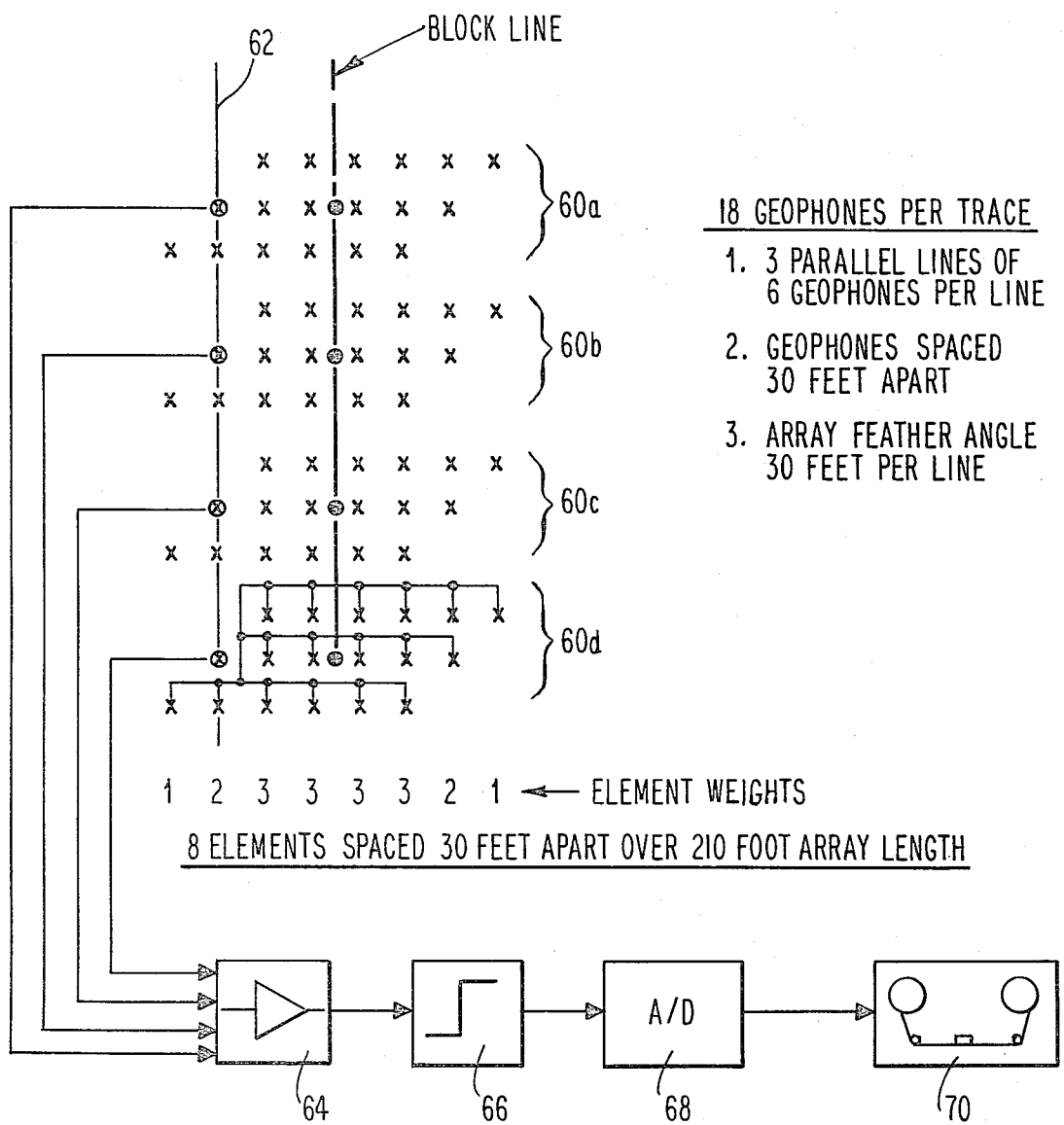
FIG. 5 shows one specific array of geophones which can be useful in the practice of the method of the invention.

Reference will now be made to FIG. 5 to show the precise arrangement of the geophones in each of the arrays 40 (FIG. 3) used at each of the recording stations indicated by the dots 52 along the periphery of the block which is diagrammed and detailed in FIG. 4. FIG. 5 shows four such arrays 60a–60d, each comprising three lines of six geophones indicated by X's. The connections of each of the 18 geophones thus placed are connected together, thus electrically summing their outputs; the cable collecting the outputs of all the arrays is passed along a line indicated at 62. As noted the end points of the three lines of geophones are off-set from one another, in this case by a spacing equal to the distance between each geophone, thus providing a center weighting effect so as to maximize the signal-to-noise ratio of the summed signal. As noted, the precise array configuration is chosen after experimentation. As noted by the legend in of FIG. 5 marked "Element Weights" the central four positions of geophones each have the equivalent of three geophones feeding each other while those on the outer edges have two and one, respectively, depending on their distance from the central position. In the Tip Top exploration, there were 18 geophones per array, each array yielding a single trace; geophones disposed in three parallel lines made up each array. Within each line the geophones were spaced 30 feet apart and the lines were displaced from one another by an equal distance, thus giving a total of a 210 foot array length. As noted above in connection with FIG. 4, the spacing of the arrays along the perimeter of the block 52 was 100 feet. The summed signals are then typically amplified in an amplifier 64, filtered by filters 66, converted to digital format in an analog-to-digital converter 68, and stored on data storage unit 70, all in accordance with prior art readings.

Figure 6:
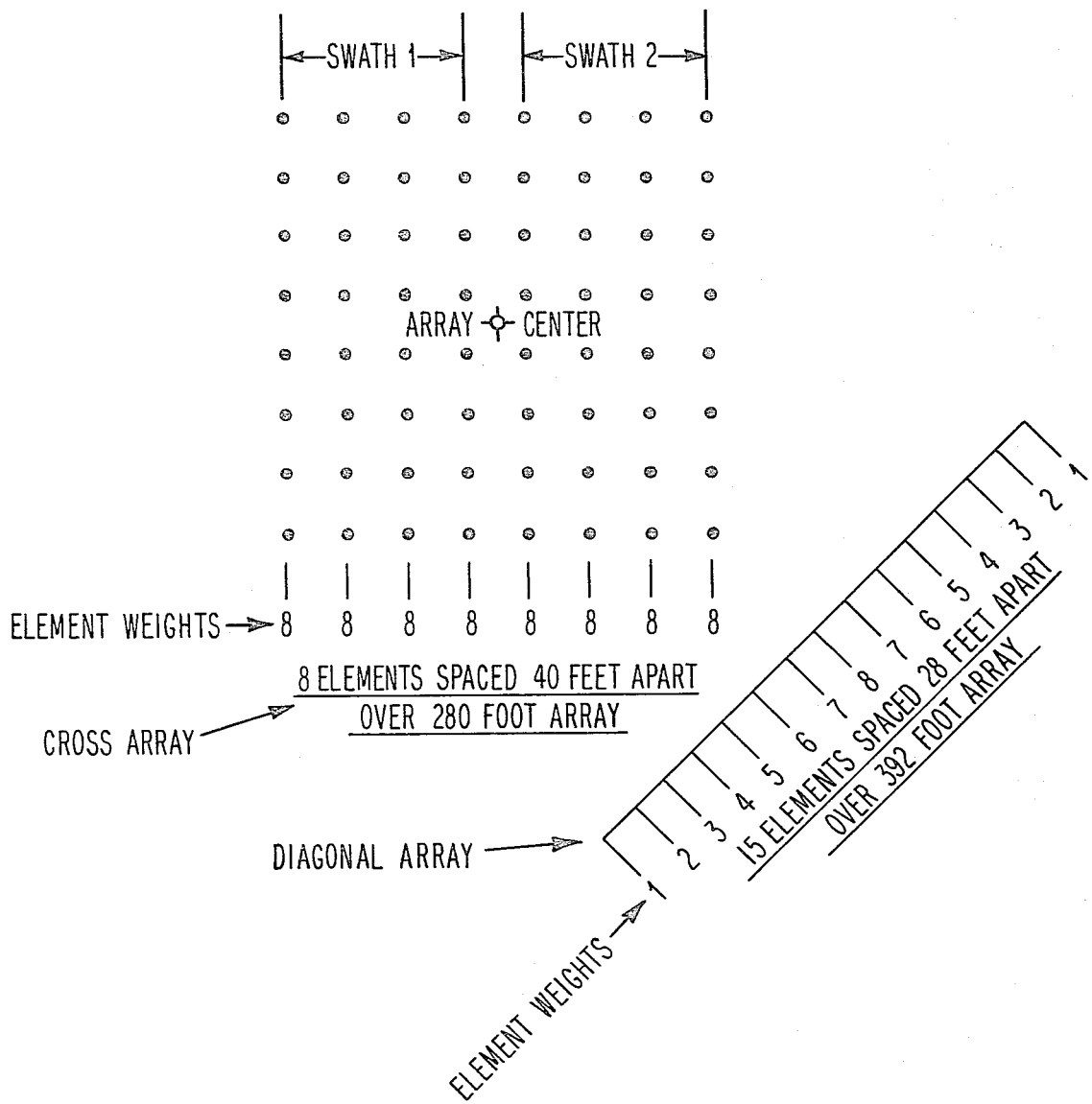
FIG. 6 shows a particular arrangement of sources of acoustic energy which is likewise useful with the method of the invention.

Reference will now be made to FIG. 6 for a description of the array of sources used in the Tip Top exploration. As mentioned above, four sources of vibrational energy, typically trucks having oscillable hydraulic platforms beneath their chassis for imparting vibrational energy to the earth, were used. They were positioned adjoining one another, one each at the positions indicated by the dots in FIG. 6. As noted in FIG. 6 there were two swaths made by the team of four trucks. The four trucks illustrated at 44 in FIG. 3 typically began sweeping at the four positions at the left side of the uppermost horizontal line of dots in FIG. 6, raised upon their plates, vibrated typically 16 seconds while sweeping the frequency of vibration between 55 and 16 Hz, stopped vibrating, were lowered onto their wheels, driven to the next position in the array, and the procedure repeated. When the first swath was completed by the four trucks having reached the bottommost row of dots in the figure, they reversed direction and returned up the right side to form a second swath. The spacing of each vibrating position from one another was 40 feet for an overall array 280 feet square. As noted in the two diagrams labeled "Element Weights", the relative weighting of any position with respect to the center of the array depends on the angular orientation and varies between 8 elements spaced 40 feet apart over a 280 foot array, when the source array is parallel to the periphery of the block, to 15 elements spaced 28 feet apart over a 392 foot array when at a 45° angle. As noted above, the data recorded by each geophone array location with respect to vibrational energy emitted at each of the points within each source array was treated as one; that is, the energy emitted by each of the four trucks at each of the 64 total locations in the array was treated as if it were emitted by a single source of acoustic energy located at the array center.

It will be appreciated by those skilled in the art that the particular arrays of geophones and of sources of acoustic energy as well as the overall layout of the exploration scheme described could be varied to suit various needs. However, when three-dimensional exploration is to be carried out, it appears that both sources and receiver should be areal; that is, comprise arrays of both sources and of receivers spread over areas significantly greater than the inter-array spacing.

For example, in the Tip Top area, as mentioned above, the emphasis was on a fault line passing through the blocks. Accordingly, if simple linear exploration had gone on in the area, the fault line might have been paralleled by the line(s) of exploration and thus been entirely missed. By comparison, the present invention, involving as it does many reflections from each of the common depth points which as noted above are spaced, in the scheme disclosed, only 50 feet from one another, yields a great wealth of data about the area explored, which can be used to generate a very accurate picture of the subterranean structure.

It will also be understood by those skilled in the art that many variations and improvements can be made on the process of the invention without departing from its essential scope. For example, while the invention has been described in connection with a scheme where geophones are placed around the periphery of a generally square area of exploration and the sources of acoustic energy were disposed within the square, the inverse would also be possible, as would of course varied shapes, if either were occasioned for reasons of access terrain difficulties or the like. It will be understood as well that the heart of the invention is the concept of using related configuration of arrays of sources of acoustic energy and of detectors, testing the efficiency of a proposed combination of arrays and varying both as necessary to improve the signal-to-noise ratio of the detected reflected signals. It is important to the practice of the process of this invention that the dependence of the usefulness of the two arrays be considered with respect to one another since variation in the configuration of the array of sources may have an important effect on the choice of the array of the geophones used. In particular, it was noted in the Tip Top exploration that it was important to have the arrays of geophones disposed at generally right angles to the block-defining lines to reduce the noise in the recorded traces. Therefore, the above description of the invention is intended to be exemplary only and not as a limitation on its scope which is more properly as defined by the following claims.

I claim:
1. A method for three-dimensional seismic exploration of the subterranean structure of the earth, comprising the steps of:
   arranging a plurality of sources of acoustic energy in a first predetermined subarray;
   arranging a plurality of detectors of acoustic energy in a plurality of arrays of detection positions, each array being substantially identical, said arrays being spaced from one another along a line of exploration, the outputs of all of the detectors in each of said arrays being connected in common to means for recording said outputs;
   operating said sources of acoustic energy simultaneously and in phase with one another to transmit an acoustic wave into the earth;
   detecting the reflection of said wave from an interface between subterranean layers of rock at said detectors;
   moving said sources of acoustic energy to other subarrays in an array of source positions spaced from other such arrays above a second line of exploration for transmission of acoustic energy to the earth;
   repeating said step of transmitting energy into the earth;

detecting reflection of said energy at said detectors;

summing the outputs of said detectors made with respect to all sources of acoustic energy within a given array;

moving said sources of acoustic energy to points in a first subarray within a differing array of source positions and repeating said steps of generating acoustic energy, detecting rflection of said energy, moving said sources to points in another subarray of said differing array, and summing the outputs of said detectors; and correlating the records thus formed corresponding to each array with one another with respect to reflection from common depth points on said interface to yield a representation of the shape of said interface having an improved signal-to-noise ratio.

2. The method of claim 1 wherein the configurations of said arrays of detectors and of sources of acoustic energy are adjusted by experimentation aimed at minimizing the signal-to-noise ratio of the outputs of said detectors.

3. The method of claim 2 in which said experimentation is performed prior to performance of a survey whereby said survey is performed using the array configurations arrived at during said experimentation.

4. The method of claim 1 wherein each said array of detectors comprises a plurality of lines generaly perpendicular to the line of exploration along which said plurality of arrays of geophones are disposed.

5. The method of claim 1 wherein said array of detectors of acoustic energy are disposed along a substantially closed line defining an area the subterranean structure of which is of particular interest.

6. The method of claim 1 wherein the arrays of locations at which acoustic energy is imparted to the earth are disposed along a substantially closed line defining an area the subterranean structure of which is of particular interest.

7. The method of either of claims 5 or 6 wherein said line substantially defines a square.

8. The method of claim 5 wherein said arrays of locations of sources of acoustic energy are disposed along lines, within said area, said lines dividing said area into substantially equal sub-areas for exploration.

9. The method of claim 6 wherein said arrays of detectors of acoustic energy are disposed along lines within said area, said lines dividing said area into sub-areas for exploration.

10. The method of claim 1 wherein at least one of the dimensions of length and width of all of said arrays of sources of acoustic energy and of detectors is greater than is the spacing of said arrays along said lines of exploration.

* * * * *